United States Patent
Yamada

(10) Patent No.: US 7,693,662 B2
(45) Date of Patent: Apr. 6, 2010

(54) DRIVE RECORDER FOR VEHICLE

(75) Inventor: Yasufumi Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 11/889,768

(22) Filed: Aug. 16, 2007

(65) Prior Publication Data

US 2008/0059054 A1 Mar. 6, 2008

(30) Foreign Application Priority Data

Sep. 6, 2006 (JP) ............................. 2006-241742

(51) Int. Cl.
*G06F 17/00* (2006.01)

(52) U.S. Cl. ...................................... 701/301

(58) Field of Classification Search ................... 701/36, 701/117–120, 200, 213, 300–301; 340/425.5, 340/435, 436, 438, 901, 903, 905; 180/271
See application file for complete search history.

(56) References Cited

U.S. PATENT DOCUMENTS 6,459,365 B2 * 10/2002 Tamura ................... 340/425.5

FOREIGN PATENT DOCUMENTS

| JP | A-2002-116034 | 4/2002 |
| JP | A-2005-075253 | 3/2005 |
| JP | A-2006-069434 | 3/2006 |
| JP | U-3125587 | 9/2006 |

* cited by examiner

*Primary Examiner*—Kim T Nguyen
(74) *Attorney, Agent, or Firm*—Posz Law Group, PLC

(57) ABSTRACT

A drive recorder stores information regarding a dangerous location where a vehicle collision or a dangerous driving situation occurred in the past. When it is determined that the vehicle approaches the dangerous location based on a position signal from a GPS receiver for detecting the present position of the vehicle, a warning is provided to the vehicle driver. According to the warning, the vehicle driver can recognize that the vehicle is approaching the dangerous location where the vehicle collision or the dangerous driving situation occurred in the past.

18 Claims, 4 Drawing Sheets

DRIVE RECORDER FOR VEHICLE

CROSS REFERENCE TO RELATED APPLICATION

This application is based on and claims priority from Japanese Patent Application No. 2006-241742 filed on Sep. 6, 2006, the disclosure of which is incorporated herein by reference.

TECHNICAL FIELD

The present invention relates to a drive recorder installed in a vehicle for recording vehicle conditions such as, for example, conditions associated with a vehicle accident.

BACKGROUND

In recent years, the installation of drive recorders in vehicles is increasing, especially in business vehicles such as taxis or trucks. Such a drive recorder is a device that records, pictures, video, and running data of the vehicle before and after the occurrence of a vehicle accident, or before, during and after the immediate acceleration and deceleration that typically occur during an accident.

For example, the drive recorder described in JP-A-2006-69434 determines whether dangerous driving has occurred based on the output from sensors such as a speed sensor, an acceleration sensor, a collision detection sensor, and/or a car distance sensor. When such dangerous driving is detected, the drive recorder outputs an audible warning from a sound output device and saves information related to the dangerous driving in a built-in memory as information of a driver specified by an IC card.

Subsequently, the necessity of driver training can be determined by reading and analyzing the data recorded in the built-in memory or the IC card of the drive recorder.

When dangerous driving leading to an accident occurs when road conditions are poor, such as during the crossing of an intersection in poor visibility conditions or while maneuvering around a sharp curve in a road, a similar dangerous driving situation or condition may occur again in the same location.

The conventional drive recorder records information related to dangerous driving, but the recorded information is typically used only to determine whether the driver drives safely once the driver has finished driving the vehicle. In other words, the conventional drive recorder does not aid a driver to drive a vehicle more safely while the vehicle is being driven based on the recorded information.

SUMMARY

In view of the above-described problems, it is an object to provide a drive recorder for a vehicle in which safe driving support information can be provided to the vehicle driver based on stored information regarding past dangerous driving situations.

In accordance with one exemplary embodiment, a drive recorder for a vehicle includes a running state detector, an image pickup device, a position detector, a first memory, a collision determination means, a saving device, a dangerous situation determination means, a second memory, an approach determination means and a warning device.

The running state detector is for outputting a running state signal depending on a running state of a vehicle. The image pickup device is for outputting an image signal indicative of conditions around the vehicle. The position detector is for outputting a position signal indicating a position of the vehicle. The first memory is for periodically recording the running state signal, the image signal and the position signal. The first memory has memory capacity to record the running state signal, the image signal and the position signals for a predetermined time period. The first memory is for overwriting the signals during a subsequent iteration of the predetermined time period. The collision determination means is for determining whether a vehicle has been involved in a collision based on the running state signal from the running state detector. The saving device is for saving the running state signal, the image signal and the position signal recorded in the first memory when the collision determination means determines that the vehicle has been involved in a collision. The dangerous situation determination means is for determining the occurrence of a dangerous driving situation based on the running state signal from the running state detector. The second memory is for recording the running state signals, the image signals and the position signals of a predetermined time transferred from the first memory when the dangerous situation determination means determines the vehicle has encountered a dangerous driving situation. The approach determination means is for determining whether the vehicle approaches a dangerous location based on a position signal recorded in the second memory and a position signal output by the position detector. The warning device is for warning the vehicle driver when the approach determination means determines that the vehicle approaches the dangerous location.

Accordingly, when the dangerous situation determination means determines that the vehicle has encountered a dangerous driving situation, the corresponding running state signal, image signal and position signal are transferred to the second memory from the first memory, and the second memory records the signals. Therefore, the position signal corresponding to the location where a vehicle was in a dangerous driving situation is saved in the second memory. When the approach determination means determines that the vehicle approaches the dangerous location based on the position signal recorded in the second memory and the position signal output by the position detector, a warning device warns the vehicle driver. Therefore, the vehicle driver can recognize that he is approaching the location where the vehicle encountered a dangerous driving situation in the past. As a result, the vehicle driver can drive carefully when the vehicle driver goes through the location. According to the drive recorder of one exemplary embodiment, effective support information can be provided to enhance safe driving.

When a vehicle collision is determined, the saving device may save the running state signal, the image signal and the position signal in the first memory by transferring and recording the signals in the second memory. Also, the saving device may save those signals by stopping overwriting of a new signal in the first memory. When the signals are transferred to the second memory, the warning can also be provided when the vehicle approaches the location of a past collision.

Preferably, the dangerous driving situation is a situation which does not involve a collision but which is nonetheless determined to put the vehicle and the driver at risk for a collision.

Preferably, the warning device comprises a display for displaying an image. And, the display warns by displaying an image indicative of the dangerous driving situation that the vehicle encountered in the past by using the image signal recorded in the second memory.

The drive recorder records the running state signal and the image signal, which are picked up the conditions around the vehicle when the vehicle was in a past dangerous driving situation, as well as position signals. By displaying the image based on the image signal, the location in which the vehicle was in a dangerous driving situation can be provided to the driver. By watching this image, the driver can be clearly reminded of when the vehicle was in a dangerous driving situation and can therefore be encouraged to drive carefully and safely.

Preferably, the approach determination means extracts a position signal at the time when the dangerous situation determination means determines the dangerous driving situation among the position signals of the predetermined time recorded in the second memory. And, the approach determination means determines whether the vehicle approaches a dangerous location based on the extracted position signal and the position signal output by the position detector.

Therefore, the vehicle can accurately determine when it approaches a location that the vehicle actually was in a dangerous driving situation.

Preferably, the approach determination means saves the listed extracted position signals. The approach determination means saves the number of extractions relating to each of extracted position signals. And, the approach determination means updates the number of extractions saved relating to the extracted position signal when a position signal indicating the same location as the listed extracted position signal is newly extracted.

By counting and saving the number of times when the vehicle was in a dangerous vehicle situation in the same location, a specifically dangerous location in which the driver should drive carefully can be identified among the extracted locations in which the driver should drive carefully can be recognized. Additionally, the processing load for the approach determination can be reduced by listing beforehand the extracted position signal corresponding to the location where the vehicle was in the dangerous driving situation.

Preferably, the approach determination means attaches a dangerous location flag indicating the location at which the vehicle diver should be warned for the listed extracted position signal depending on the number of extractions. The approach determination means determines that the vehicle approaches a dangerous location only when the vehicle approaches a location corresponding to an extracted position signal having an associated attached dangerous location flag.

Therefore, a dangerous location can be flexibly identified depending on the number of extractions. For example, the warning can be generated for a location where a vehicle was in a dangerous driving situation once, or the warning can be generated for a location where a vehicle was in a dangerous driving situation more than twice.

Preferably, the approach determination means decrease the number of extractions regarding the extracted position signal by not updating the number of extractions until a predetermined term elapses.

Regarding a location in which a vehicle encounters a dangerous driving situation and which is not determined until a predetermined term has elapsed, the driver can drive more carefully upon receiving a warning in such a location. In this case, a continuous warning may become distracting to the driver. Therefore, the number of distracting driver warnings can be minimized.

Preferably, the second memory records the running state signal, the image signal and the position signal transferred from the first memory when the collision determination means determines the vehicle has been involved in a collision.

The approach determination means determines whether the vehicle approaches a past collision location based on the position signal recorded in the second memory and the position signal output by the position detector. And, the warning device warns the vehicle driver when the approach determination means determines that the vehicle approaches a collision location.

Preferably, the signals recorded in the second memory include signals before and after the dangerous determination means determines the vehicle encountered the dangerous driving situation.

Preferably, the warning device comprises a sound device for outputting a warning sound.

In accordance with another exemplary embodiment, a drive recorder for a vehicle includes at least one vehicle operation detector, a memory device, a processor and a warning device. The vehicle operation detector is for outputting a running state signal depending on a running state of a vehicle and for outputting a position signal indicating a position of the vehicle. The memory device is for periodically recording the running state signal and the position signal, and storing the position signal when the vehicle has encountered a dangerous driving situation. The processor is configured to determine the occurrence of a dangerous driving situation based on the running state signal from the vehicle operation detector and to determine whether the vehicle approaches a dangerous location based on the position signal stored in the memory device and the position signal output by the vehicle operation detector. The warning device is for warning the vehicle driver when the processor determines that the vehicle approaches a dangerous location.

Preferably, the dangerous driving situation is a situation which does not involve a collision but which is nonetheless determined to put the vehicle and the driver at risk for a collision.

Preferably, the memory device stores the position signal when the vehicle has been involved in a collision. The processor is configured to determine whether the vehicle has been involved in a collision based on the running state signal from the vehicle operation detector, and to determine whether the vehicle approaches the past collision location based on the position signal stored in the memory device and the position signal output by the vehicle operation detector. And the warning device warns the vehicle driver when the processor determines that the vehicle approaches a collision location.

In accordance with another exemplary embodiment, a drive recorder for a vehicle includes at least one vehicle operation detector, a memory device, a processor and a warning device.

The vehicle operation detector is for outputting a running state signal depending on a running state of a vehicle, outputting an image signal picked up a condition around the vehicle and a position detector for outputting a position signal indicating a position of the vehicle. The memory device includes a first memory, a saving device and a second memory. The first memory is for periodically recording the running state signal, the image signal and the position signal. The first memory has memory capacity to record the running state signal, the image signal and the position signal for a predetermined time period. The first memory is for overwriting the signals during a subsequent iteration of the predetermined time period. The saving device is for saving the running state signal, the image signal and the position signal recorded in the first memory when the vehicle has been involved in a collision.

The second memory is for recording the running state signal, the image signal and the position signal transferred from the first memory when the vehicle has encountered a dangerous driving situation. The processor is configured to determine whether the vehicle has been involved in a collision based on the running state signal from the vehicle operation detector, to determine the occurrence of a dangerous driving situation based on the running state signal from the vehicle operation detector and to determine whether the vehicle approaches a dangerous location based on a position signal recorded in the second memory and a position signal output by the vehicle operation detector. The warning device is for warning the vehicle driver when the processor determines that the vehicle approaches the dangerous location.

BRIEF DESCRIPTION OF THE DRAWINGS

Other objects, features and advantages of various exemplary embodiments will become more apparent from the following detailed description made with reference to the accompanying drawings, in which.

DETAILED DESCRIPTION OF THE PREFERRED EMBODIMENTS

Figure 1:
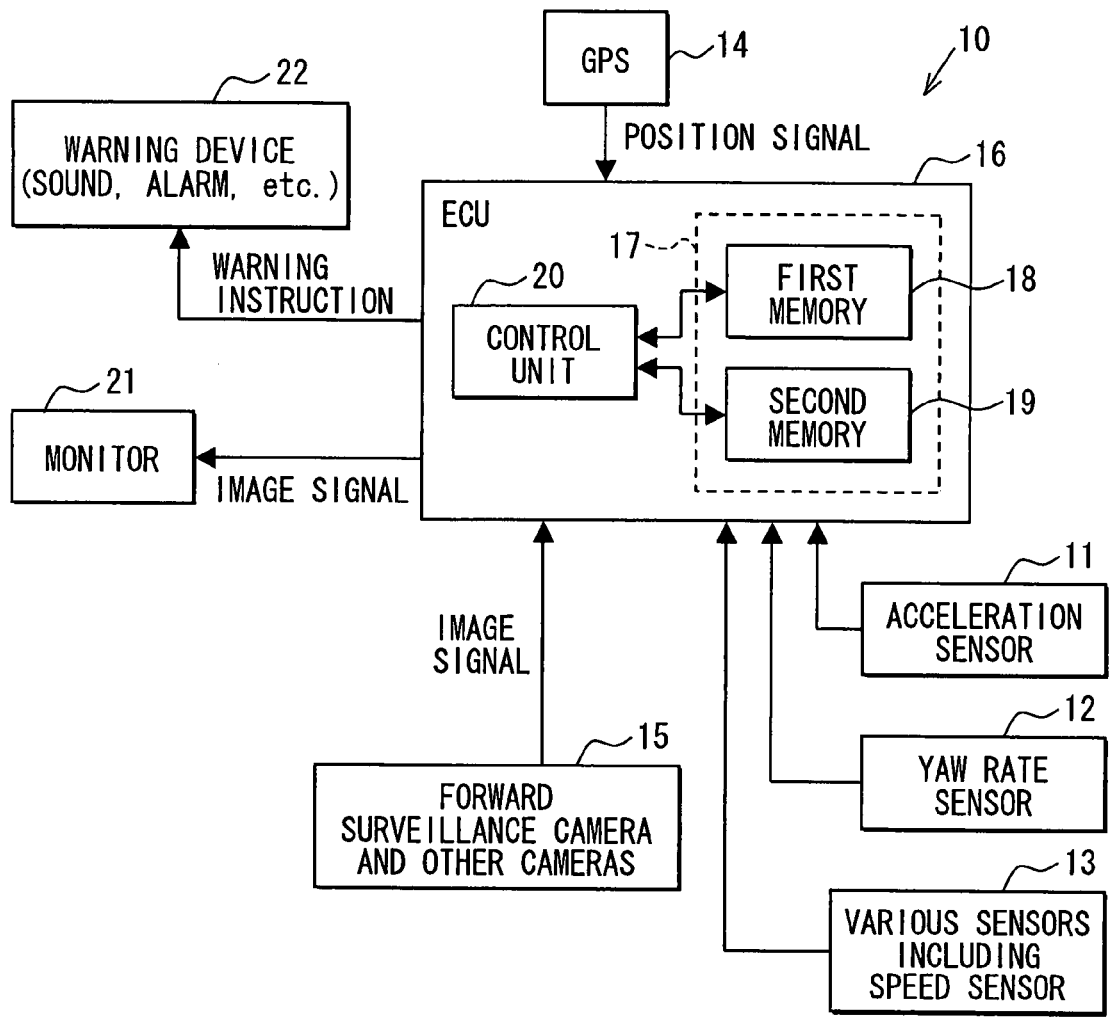
FIG. 1 is a block diagram showing the configuration of a drive recorder for a vehicle according to an exemplary embodiment.

A drive recorder for a vehicle according to various exemplary embodiments will now be explained as follows. FIG. 1 is a block diagram showing a drive recorder 10 for a vehicle.

As shown in FIG. 1, the drive recorder 10 has an acceleration sensor 11 and a yaw rate sensor 12 to detect the running state of the vehicle. The acceleration sensor 11 detects acceleration in forward and backward directions and/or a crosswise direction of the vehicle. The yaw rate sensor 12 detects the yaw rate, which is the change in angular velocity in the turning direction of the vehicle. Based on detection signals detected by the acceleration sensor 11 and the yaw rate sensor 12, the ECU (electronic control unit) 16 described below can determine when the vehicle has been involved in a collision and also a dangerous driving situation or condition which did not involve a collision but which was nonetheless determined to put the vehicle and the driver at risk for a collision.

In other words, the ECU 16 determines when the vehicle collides with an object when the acceleration sensor 11 detects a large acceleration or the yaw rate sensor 12 detects a large yaw rate that occurs at the time of the vehicle collision. Also, the ECU 16 determines the presence of a dangerous situation requiring the vehicle to perform an immediate slowdown, an immediate acceleration or a short turn when the acceleration or the yaw rate is detected that is not large enough to indicate a collision but is large to indicate that the probability of a normal driving situation is low. More specifically, the ECU 16, for example, is pre-programmed with a range of acceleration and yaw rate corresponding to the collision and corresponding to the dangerous driving situation. The ECU 16 can determine the occasion of the collision and the occurrence of a dangerous driving situation by determining whether detected acceleration and yaw rate fall within either range.

The drive recorder 10 comprises, in addition to the acceleration sensor 11 and the yaw rate sensor 12, other sensors such as, for example, a speed sensor for detecting the running speed of the vehicle, a steerage angle sensor for detecting the steerage angle of the steering wheel of the vehicle, a temperature sensor for detecting outside temperature, a blinker sensor for outputting a signal corresponding to a movement state of the blinker and a wiper sensor for outputting a signal corresponding to a movement state of the windshield wiper. Outputs of these sensors provide useful information about a vehicle condition and the driving condition for use in analyzing the cause of a collision when a vehicle is involved in a collision.

Furthermore, the drive recorder 10 comprises a GPS receiver 14 for outputting the position signal to indicate the running position of the vehicle by using the satellite signal from the GPS satellite and a surveillance camera 15 for picking up the condition around the vehicle. The surveillance camera 15 includes a front surveillance camera for monitoring the forward progress of the vehicle. The surveillance camera 15 may further monitor the rear and/or the side of the vehicle. The image signals from this surveillance camera 15 are very useful in analyzing the cause of a collision.

The ECU 16 has a memory 17 and control unit 20. The control unit 20 periodically samples signals output from each of the sensors 11-13, the GPS receiver 14, and the surveillance camera 15 by control processing, and records sampled signals in the memory 17.

Figure 2:
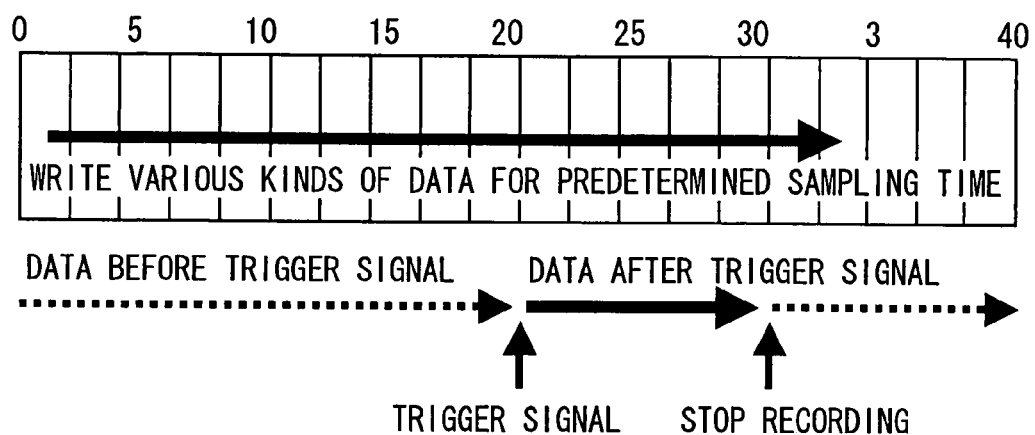
FIG. 2 illustrates a method for recording signals output from various sources.

The memory 17 has a first memory 18 and a second memory 19. The first memory 18, as shown in FIG. 2, has sufficient capacity to record the signals sampled every predetermined interval and output from each of the sensors 11-13, the GPS receiver 14 and the surveillance camera 15 for a predetermined time period (for example, 40 seconds). When this first memory 18 records signals exceeding the capacity of the predetermined time period, the first memory 18 begins to overwrite the signals during a subsequent iteration of the predetermined time period. Thus, the first memory 18 functions as an infinite loop regarding the recording of the signals. The first memory 18 temporarily records the various signals sampled for a period up to the predetermined time period.

In such a state, when the control unit 20 determines that the vehicle collision and the dangerous driving situation occurred based on the detection signals of the acceleration sensor 11 and the yaw rate sensor 12, the control unit 20 generates a record trigger signal. When this record trigger signal is generated, as shown in FIG. 2, the control unit 20 records the sampled various signals in the first memory 18 further, for example, for 10 seconds (predetermined time) from the time that the record trigger signal is generated, and the control unit 20 subsequently stops recording the new signals. Then, the control unit 20 transfers the various signals, which are recorded in the first memory 18 and sampled for a predetermined time including before and after the generation of the record trigger signal, to the second memory 19. The second memory 19 records and saves the transferred various sampled signals as a unit. Consequently, the second memory 19 saves the various sampled signals corresponding to the time that the vehicle collision and a dangerous driving situation occur.

The ECU 16 determines whether a vehicle approaches the location at which the collision or the dangerous driving situation occurred by using the position signal among the various signals stored in the second memory. The ECU 16 compares the position signal detected by the GPS receiver 14 with the stored position signal, and the ECU 16 determines whether the vehicle is within a predetermined distance for a dangerous location corresponding to the stored position signal.

When a vehicle collision and a dangerous driving situation are possibly caused by road environment factors such as, for example, an intersection with poor visibility or a sharp curve, it is determined that a similar dangerous driving situation may occur again at the same location.

Therefore the drive recorder 10 of the present embodiment includes a monitor (display) 21 for displaying pictures or videos (image) based on image signals stored in the second memory 19 and/or a warning device 22 for generating an audible warning or a warning alarm tone (sound). The monitor 21 and the warning device 22 are able to warn a driver when the ECU 16 determines the vehicle has approached the dangerous location.

In this case, the driver of the vehicle can recognize that a vehicle approaches the location that the vehicle encountered the dangerous driving situation including a collision in the past just by warning with the audible warning and the alarm tone. As a result, the driver of the vehicle can drive carefully when the driver goes through the location. Furthermore, when the monitor 21 shows the pictures or videos indicating the dangerous driving situation that occurred in the past, the dangerous location and the dangerous driving situation can be shown to the driver. Upon seeing these pictures or videos, the driver can be reminded of a situation when the vehicle was in danger. It is preferable because the driver drives more carefully and safely.

Figure 3:
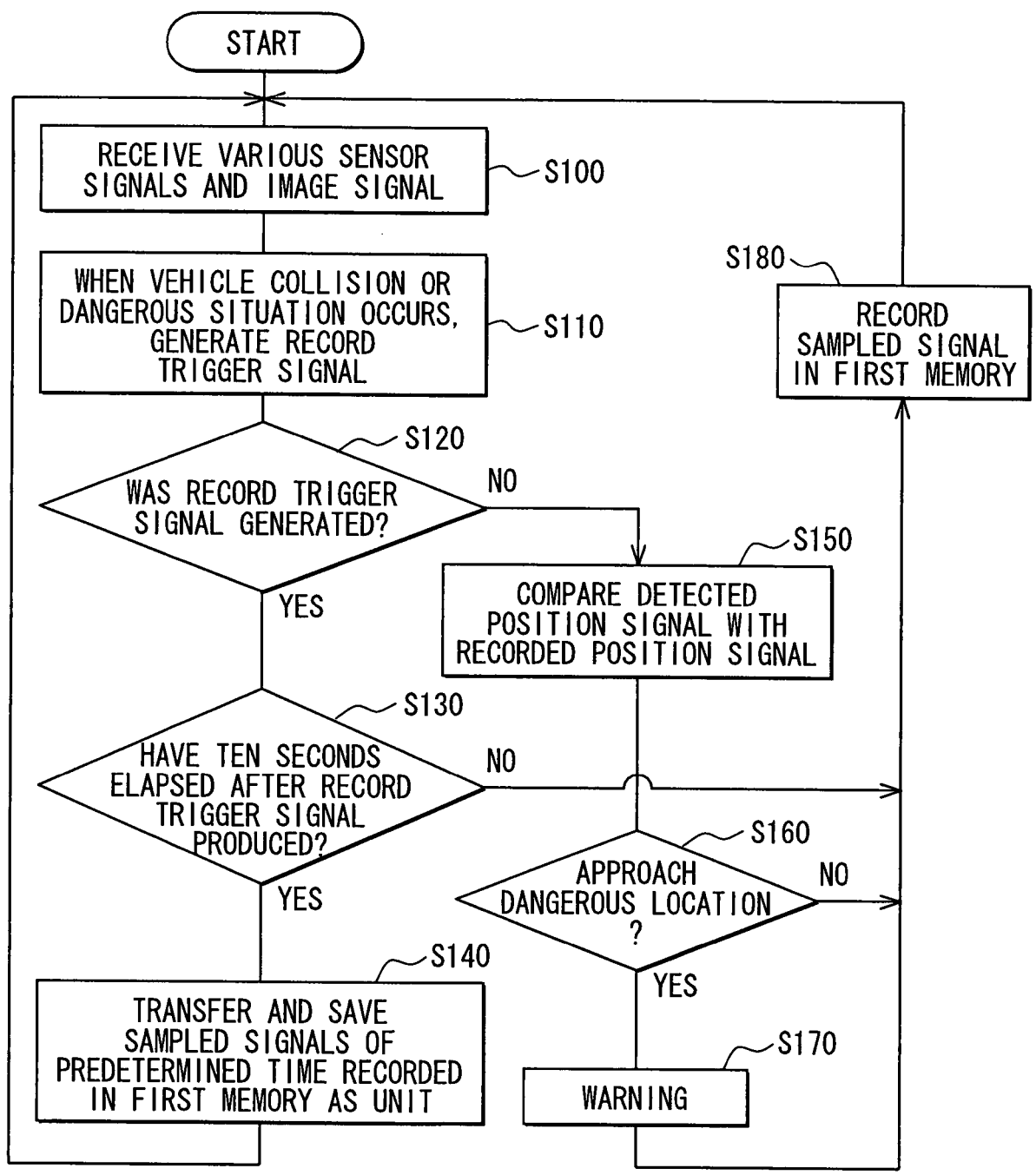
FIG. 3 is a flow diagram showing a process to be periodically performed by an electronic control unit (ECU) of a drive recorder when a driver starts to drive a vehicle.
Figure 4:
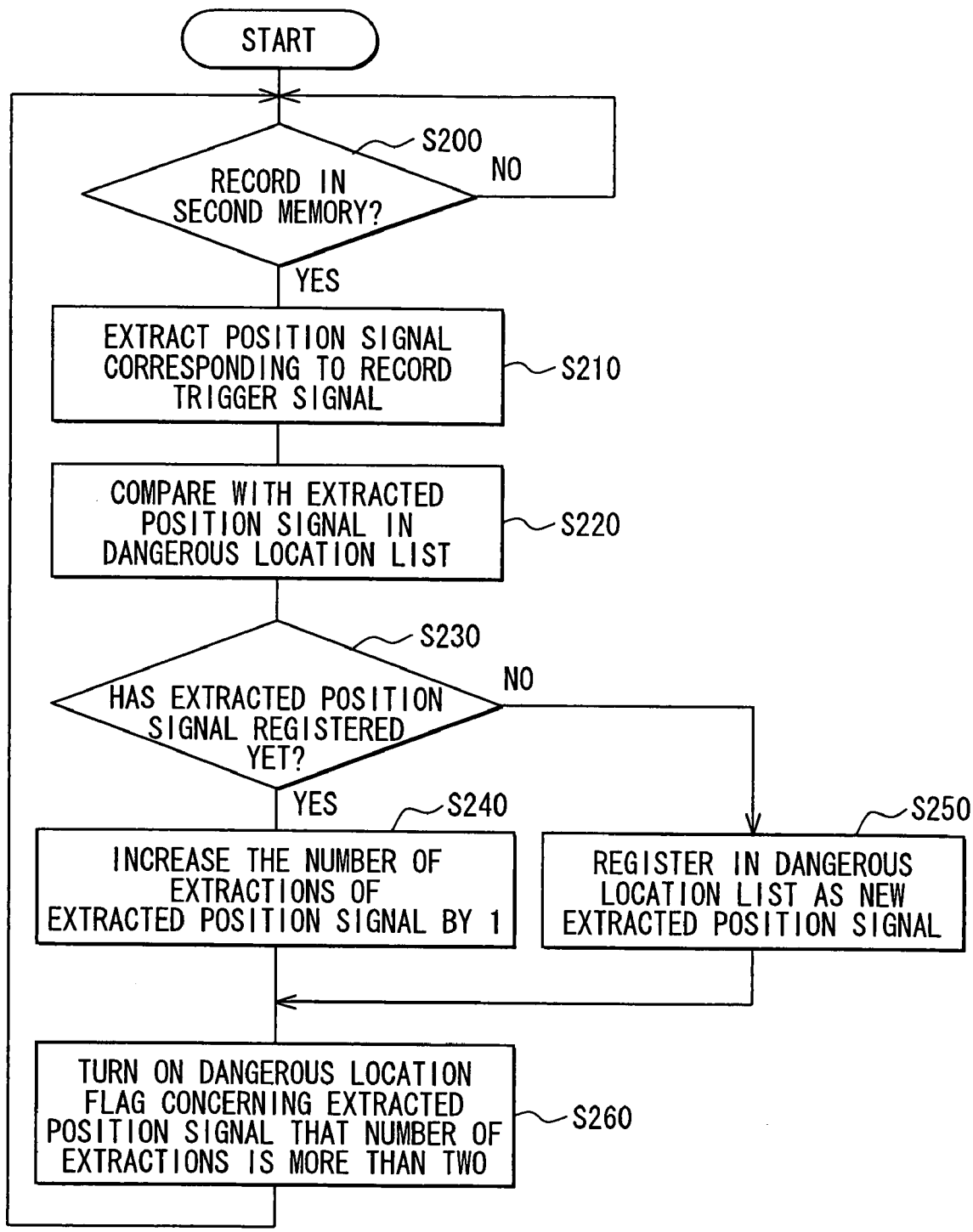
FIG. 4 is a flow diagram showing a process to be performed when various signals are transferred from a first memory to a second memory.

Next, FIG. 3 and FIG. 4 are flow diagrams illustrating processes to be executed in the ECU 16. The flow diagram of FIG. 3 shows a process that is periodically executed when the driver starts driving the vehicle. The flow diagram of FIG. 4 shows a process that is executed at the time when the various signals are transferred to the second memory 19 from the first memory 18.

In the flow diagram of FIG. 3, at first, the control unit 20 of the ECU 16 receives the signals output from the sensors 11-13, the GPS receiver 14 and the surveillance camera 15 at S100. Therefore, the ECU 16 periodically samples signals output from the sensors 11-13, the GPS receiver 14 and the surveillance camera 15.

At S110, the control unit 20 determines whether a vehicle collision or a dangerous driving situation has occurred based on the input acceleration signal and the input yaw rate signal. When the control unit 20 determines the vehicle collision or the dangerous driving situation has occurred, the control unit 20 generates the record trigger signal. At S120, the control unit 20 determines whether the record trigger signal is generated at S110. When the control unit 20 determination is "Yes" at S120, the control unit 20 advances to S130.

At S130, the control unit 20 determines whether "10 seconds," which is established as an exemplary predetermined time after the record trigger signal is generated, has elapsed to save the various signals of the predetermined time including signals before and after the generation of the record trigger signal. At S130, when the control unit 20 determines that 10 seconds has not yet elapsed, it advances to S180 and, as shown in FIG. 2, the control unit 20 records the sampled various signals in the determined area of the first memory 18. Therefore, the recording of various signals is continued for 10 seconds after the record trigger signal is generated.

When 10 seconds has elapsed from the generation of the record trigger signal, and the determination at S130 changes to "Yes," the process proceeds to S140. At S140, the control unit 20 transfers the various sampled signals recorded in the first memory 18 and including signals before and after the generation of the record trigger signal to the second memory 19. Thus, the second memory 19 records and saves the various signals output at the time when a vehicle collision and a dangerous driving situation occurred.

FIG. 4 illustrates the process that is executed when various signals, which are output when a vehicle collision and a dangerous driving situation occur, are recorded in the second memory 19.

At first, at S200, the control unit 20 determines whether the various signals for the predetermined time, which are output from the sensors 11-13, the GPS receiver 14 and the surveillance camera 15, are recorded in the second memory 19. When the determination of this step S200 is "Yes," the control unit 20 advances to S210 and extracts the position signals corresponding to the record trigger signal from the various signals.

Because various signals including signals before and after the record trigger signal are transferred and saved in the second memory 19, the second memory 19 saves a plurality of position signals. In fact, the location of the vehicle collision and a dangerous driving situation exactly correspond to the position signal sampled at the time the trigger signal was generated. Therefore, the control unit 20 can obtain the exact information of the location where the vehicle collision and the dangerous driving situation occurred by extracting the position signal when record trigger signal was generated.

Figure 5:
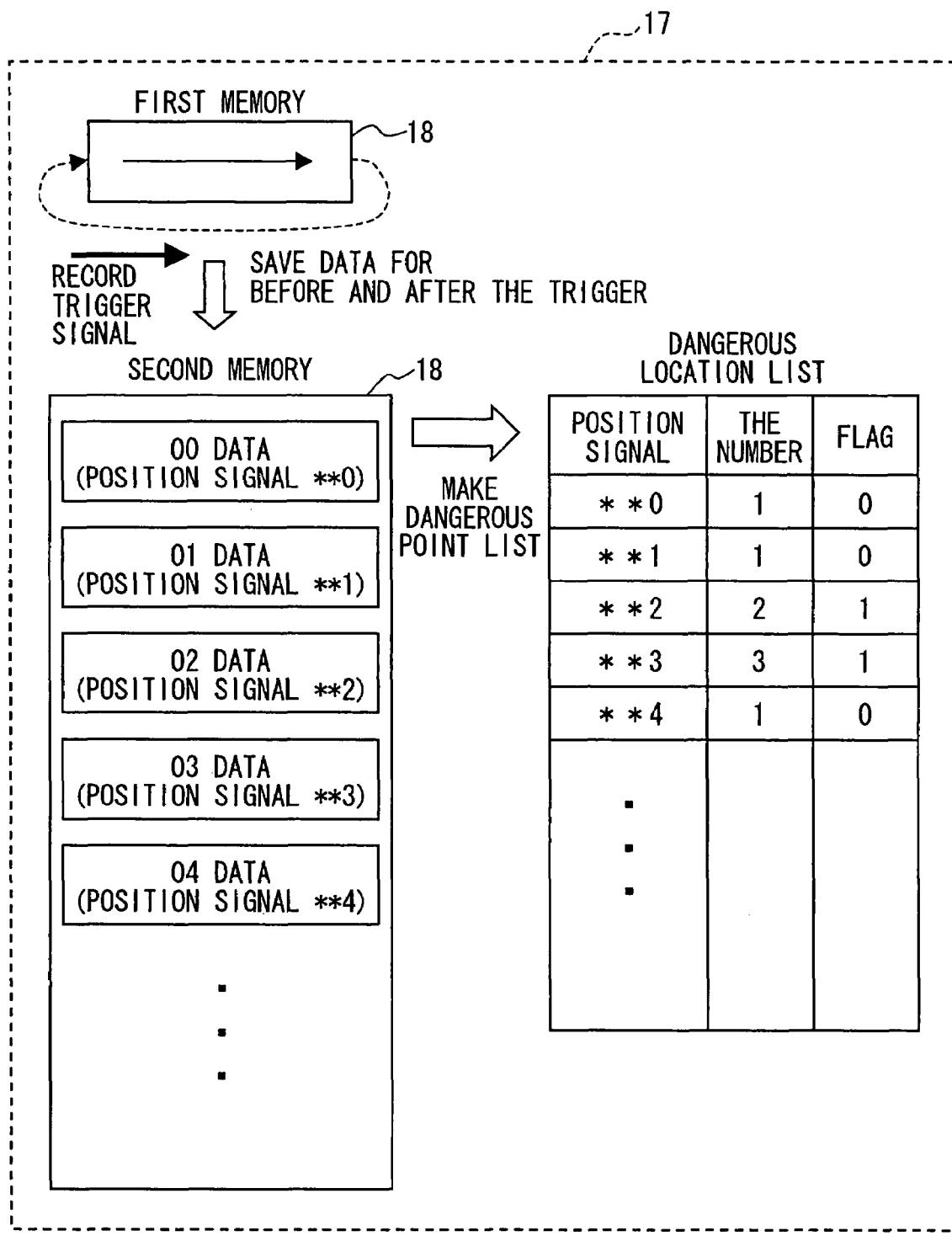
FIG. 5 illustrates operation of a memory of the ECU of a drive recorder.

Next, at S220, the control unit 20 compares the position signal extracted at S210 with an extracted position signal that is registered in a dangerous location list. The dangerous location list lists the position signals extracted at S210 as shown in FIG. 5. This dangerous location list is saved in the memory 17. The extracted position signals are extracted corresponding to the locations where the vehicle collision and the dangerous driving situation occurred and are listed beforehand. Therefore, when the approach of the vehicle to the location corresponding to those extracted position signals is determined, the processing can be simplified.

Furthermore, the number of extractions of the extracted position signal and a dangerous location flag indicating the dangerous location and indicating that the driver should be warned are saved in the dangerous location list related to extracted position signals. The number of extractions indicates how many times the position signals of the same location are extracted at S210. In other words, when the position signal indicating the location is the same as the extracted position signal that was listed and saved is extracted again, the number of extractions saved signals relating to the extracted position signal is increased. Thus, according to counting and saving the number of encounters when the vehicle encounters the dangerous driving situation multiple times at the same location, the location in which the driver should be careful can be specifically recognized among the locations that the driver should drive carefully.

The dangerous location flag indicates a location where the driver should be warned when the vehicle approaches the location. The warning is performed when a vehicle approaches the location corresponding to the only extracted position signal at which the dangerous location flag is turned on. This dangerous location flag is turned on or off depending on the number of extractions of each position signal. The control unit 20 generates a warning when the vehicle approaches the object location that only corresponds to the extracted position signal including a dangerous location flag that is turned on. Therefore, it is able to flexibly set the location where the driver should be warned depending on the number of extractions. For example, establishing when the driver is warned at the time of the approach the location where the vehicle encountered the dangerous driving situation once, or when the driver is warned at the time of the approach to the location where the vehicle encountered the dangerous driving situation more than twice, can be changed easily.

At S230, the control unit 20 determines whether there are any extracted position signals that correspond to the position signal extracted at S210 in the extracted position signals already registered in the dangerous location list based on the comparison result at S220. The processing at S230 includes not only the position signals corresponding to the registered extracted position signals exactly but also the position signals corresponding to a predetermined range about the registered extracted position signals. At S230, when the control unit determination is "Yes," it advances to S240 and increments the number of extractions corresponding to the extracted position signal at S210 by one. On the other hand, when the control unit 20 determination is "No" at S230, it advances to S250 and registers the position signals corresponding to the record trigger signal as a new extracted position signal in the dangerous location list, and sets the number of extractions to 1.

At S260, the control unit 20 turns on the dangerous location flag concerning the extracted position signal that the number of extractions is more than two. Alternatively, the control unit 20 may turn on the dangerous location flag concerning the extracted position signal that the number of extractions is one, two or any predetermined number.

Next, processing after S150 that has not yet been explained in the flow diagram of FIG. 3 is described. When the control unit 20 determines the record trigger signal has not yet been generated yet at S120, the control unit 20 advances to S150. At S150, the control unit 20 compares the detected position signal corresponding to the present position of the vehicle detected by the GPS receiver 14 with the extracted position signals having a corresponding dangerous location flag in the dangerous location list saved in the memory 17. The control unit 20 calculates the distance from the present position of the vehicle to the dangerous location corresponding to the extracted position signal.

At S160, the control unit 20 determines whether the vehicle approaches the dangerous location based on the distance calculated at S150. When the control unit 20 determination is "Yes" at S160, it advances to S170 and warns the driver with the monitor 21 and the warning device 22 explained above.

When the control unit 20 determines that the vehicle is not approaching the dangerous location at S160, or after the control unit 20 has warned the driver at S170, it advances to S180 explained above and records various signals from the sensors 11-13, the GPS receiver 14 and the surveillance camera 15 in the first memory 18.

As mentioned above, according to the drive recorder of the present exemplary embodiment, information about the location where the vehicle collision and the dangerous driving situation occurred is saved. And, when it is determined that the vehicle approaches the dangerous driving situation location, a warning is provided to the driver. Thus, the driver of the vehicle can recognize that he is approaching the location where the vehicle encountered a dangerous driving situation in the past by the warning and can be expected to drive carefully when driving through the location. According to the drive recorder of the present exemplary embodiment, effective support information to drive safely can be provided to the driver.

Although the preferred embodiments have been fully described with reference to the accompanying drawings, it is to be noted that various changes and modifications will become apparent to those skilled in the art.

For example, in the above embodiment, the control unit 20 transfers the various signals to the second memory 19 from the first memory 18, and saves them when the control unit 20 determines the occurrence of a vehicle collision as well as a dangerous vehicle situation. However, when the vehicle collision occurs, those signals may be not transferred to the second memory 19 but merely saved in the first memory 18 by stopping the overwrite of new signals to the first memory 18. Therefore, when the accident of the vehicle collision occurs, useful information can be stored regarding the cause of the collision.

However, if the various signals concerning the running state of the vehicle are transferred to the second memory 19 and recorded when the vehicle collision occurs, like the above embodiment, it is preferable because a warning can be generated when the vehicle approaches not only the location where the vehicle was in a dangerous driving situation but also the location where the vehicle collision occurred in the past.

In the above embodiment, the extracted position signals corresponding to the location that the vehicle collision and the dangerous driving situation occurred are listed and the number of extractions is recorded. However, by not updating the number of times position signals are extracted until a predetermined term elapses, the number of extractions may be decreased or reset to zero for certain locations in which dangerous situations are not regularly present. Regarding the location in which a collision or a dangerous driving situation is not determined until a predetermined term elapses, the driver can be prompted by a warning to drive more carefully. Therefore, the number of distracting driver warnings can be minimized.

As for the determination whether a predetermined term has elapsed, the control unit 20 may count an elapsed time after the update of the number of extractions of every extracted position signal and may determine the elapsed time whether this elapsed time reached the predetermined term. Also, the control unit 20 may set a common predetermined term for the number of extractions of all the extracted position signals and may determine whether the number of extractions of each extracted position signal was updated in the common predetermined term.

In the above exemplary embodiment, a vehicle collision and a dangerous driving situation of the vehicle are determined based on detection signals generated by the acceleration sensor 11 and the yaw rate sensor 12. If two sensors are provided, determination precision improves. However, the vehicle collision and the occurrence of the dangerous driving situation may be determined by the detection signal of either of the sensors. The other sensors may alternatively be used as far as the vehicle collision and the occurrence of the dangerous driving situation can be determined.

In the above exemplary embodiment, the drive recorder is installed in the vehicle by itself. However, if a drive recorder and a navigation device are installed in the vehicle, the drive recorder may receive the position signals of the vehicle from the navigation device.

Regarding the above, is not preferable that the navigation device performs all functions of the drive recorder because the drive recorder always samples the various signals while the vehicle is driven and determines the running state of the vehicle. If it is determined that the vehicle collision or the dangerous driving situation has occurred, it is necessary to continuously transfer the various signals between the memories. If the navigation device performs such a function, the processes of indicating a map and navigating the route in the navigation device can be hindered, or the function of the drive recorder may decline (the recording signals may be reduced or sampling intervals increased).

In the above embodiment, various signals are recorded in the second memory 19 when the vehicle collision and the dangerous driving situation that does not reach a collision occur. However, the various signals may alternatively be recorded in the second memory 19 only when the vehicle collision occurs. In this case, the warning is generated only when the vehicle approaches the location of a past vehicle collision. In the above exemplary embodiment, the control unit 20 saves the various signals during the predetermined time including the time before and after the occurrence of the vehicle collision or the dangerous driving situation (the generation of the record trigger signal) in the second memory 19. However, it may record only the time before or after the occurrence of the vehicle collision or the dangerous driving situation. Or, it may record only the various signals corresponding to the occurrence of the vehicle collision or the dangerous driving situation.

In the above exemplary embodiment, the surveillance camera 15 may not be provided in the drive recorder 10.

In the above exemplary embodiment, the first memory 18 begins to overwrite the signals during a subsequent iteration of the predetermined time period when this first memory 18 records signals exceeding the capacity of the predetermined time period, the first memory 18. However, the first memory 18 may overwrite any signals including signals being presently recorded.

Such changes and modifications are to be understood as being within the scope of the present invention as defined by the appended claims.

What is claimed is:

1. A drive recorder in a vehicle, the drive recorder comprising:
   a running state detector configured to output a running state signal depending on a running state of the vehicle;
   an image pickup device configured to output an image signal indicative of conditions around the vehicle;
   a position detector configured to output a position signal indicating a position of the vehicle;
   a first memory having a memory capacity and configured to record during a first predetermined time period and to overwrite during a subsequent iteration of the first predetermined time period (i) running state signals outputted by the running state detector, (ii), image signals outputted by the image pickup device, and (iii) and position signals outputted by the position detector, the first predetermined time period being repeated;
   a collision determination means for determining whether the vehicle has been involved in a collision based on the running state signal from the running state detector;
   a saving device configured to save the running state signals the image signals and the position signals which are recorded in the first memory and associated with the collision, when the collision determination means determines that the vehicle has been involved in the collision;
   a dangerous situation determination means for determining an occurrence of a dangerous driving situation based on the running state signal from the running state detector;
   a second memory configured to record, each time the occurrence of the dangerous driving situation is determined, the running state signals, the image signals and the position signals which are transferred from the first memory with respect to a second predetermined time period associated with the each occurrence of the dangerous driving situation;
   an approach determination means for determining whether the vehicle approaches a dangerous location based on (i) a position signal which is recorded in the second memory with respect to the each occurrence of the dangerous driving situation, and (ii) a position signal presently outputted by the position detector; and
   a warning device configured to warn a driver of the vehicle when the approach determination means determines that the vehicle approaches the dangerous location.

2. The drive recorder according to claim 1, wherein the dangerous driving situation is a situation which does not involve the collision but which is nonetheless determined to put the vehicle and the driver at risk for the collision.

3. The drive recorder according to claim 2, wherein the second memory records the running state signal, the image signal and the position signal transferred from the first memory when the collision determination means determines the vehicle has been involved in a collision;
   the approach determination means determines whether the vehicle approaches a past collision location based on the position signal recorded in the second memory and a position signal presenting outputted by the position detector; and
   the warning device warns the vehicle driver when the approach determination means determines that the vehicle approaches the past collision location.

4. The drive recorder according to claim 1, wherein the warning device comprises a display for displaying an image; and
   the display warns by displaying an image indicative of the dangerous driving situation that the vehicle encountered in a past by using the image signal recorded in the second memory.

5. The drive recorder according to claim 1, wherein the approach determination means extracts a position signal at a time when the dangerous situation determination means determines the each occurrence of the dangerous driving situation among the position signals of the second predetermined time period recorded in the second memory, and determines whether the vehicle approaches a dangerous location based on the extracted position signal and a position signal presently outputted by the position detector.

6. The drive recorder according to claim 5, wherein the approach determination means saves, in a list, each extracted position signal in associated with, a number of extractions relating to the each of extracted position signal, and updates the number of extractions saved relating to the each extracted position signal when a position signal indicating a location identical to a location indicated by the each extracted position signal is newly extracted.

7. The drive recorder according to claim 6, wherein the approach determination means attaches a dangerous location flag indicating a location at which the driver should be warned to the each extracted position signal in the list depending on the number of extractions, and determines that the vehicle approaches a dangerous location when the vehicle approaches only a location corresponding to an extracted position signal having the dangerous location flag.

8. The drive recorder according to claim 6, wherein the approach determination means decreases the number of extractions regarding the each extracted position signal in a case that the number of extractions is not updated until a predetermined term elapses.

9. The drive recorder according to claim 1, wherein the signals recorded in the second memory are with respect to the second predetermined time period, the second predetermined time period ranging before and after the each occurrence of the dangerous driving situation.

10. The drive recorder for vehicle according to claim 1, wherein
the warning device comprises a sound device for outputting a warning sound.

11. The drive recorder for vehicle according to claim 1, wherein:
the approach determination means extracts a position signal at a time when the dangerous situation determination means determines the each occurrence of the dangerous driving situation among the position signals of the second predetermined time period recorded in the second memory, to thereby save, in a list, a plurality of extracted position signals in association with a number of extractions relating to each of the extracted position signals while incrementing the number of extractions when a position signal indicating a location identical to a location indicated by the each of the extracted position signals is newly extracted;
the approach determination means determines whether the vehicle approaches a dangerous location based on the extracted position signals in the list and a position signal presently outputted by the position detector; and
when it is determined that the vehicle approaches the dangerous location, the warning device warns the driver depending on the number of extractions with respect to the extracted position signal indicating the dangerous location.

12. The drive recorder for vehicle according to claim 11, wherein:
a count of an elapsed time is started since the number of extractions relative to the each of the extracted position signals is updated; and
when it is determined that the number of extractions is not updated until the elapsed time reaches a predetermined term, the number of extractions is decremented.

13. The drive recorder for vehicle according to claim 12, wherein:
the predetermined term used for determining the decrementing the number of extractions is identical with respect to all the extracted position signals in the list.

14. A drive recorder in a vehicle, the recorder comprising:
a running state detector configured to output a running state signal depending on a running state of the vehicle;
a position detector configured to output a position signal indicating a position of the vehicle;
a first memory having a memory capacity for storing during a first predetermined time period and overwriting during a subsequent iteration of the first predetermined time period (i) running state signals outputted by the running state detector and (ii) position signals outputted by the position detector, the first predetermined time period being repeated;
a second memory configured to store data transferred from the first memory; and
a processor configured to
determine an occurrence of a dangerous driving situation based on the running state signal from the running state detector;
transfer signals stored in the first memory to the second memory, when each occurrence of the dangerous driving situation is determined,
the transferred signals being running state signals and position signals with respect to a second predetermined time period ranging before and after the each occurrence of the dangerous driving situation,
extract a position signal at a time, when the each occurrence of the dangerous situation is determined, among the transferred position signals of the second predetermined time period recorded in the second memory,
save, in a list, a plurality of extracted position signals in association with a number of extractions of each of the extracted position signals while incrementing the number of extractions of the each of the extracted position signals when a position signal indicating a location identical to a location indicated by the each of the extracted position signals is newly extracted, and
determine whether the vehicle approaches a dangerous location based on the extracted position signals in the list and a position signal presently outputted by the position detector; and
a warning device configured to warn, when it is determined that the vehicle approaches the dangerous location, a driver of the vehicle depending on the number of extractions with respect to the extracted position signal indicating the dangerous location,
wherein the processor is further configured to
start a count of an elapsed time when the number of extractions relative to the each of the extracted position signals is updated, and
decrement the number of extractions when the number of extractions is not updated until the elapsed time reaches a predetermined term.

15. The drive recorder according to claim 14, wherein
the dangerous driving situation is a situation which does not involve a collision but which is nonetheless determined to put the vehicle and the driver at risk for the collision.

16. The drive recorder according to claim 15, further comprising
a saving device configured to store the position signal when the vehicle has been involved in the collision;
the processor being further configured to determine whether the vehicle has been involved in the collision based on the running state signal from the vehicle running state detector, and to determine whether the vehicle approaches a past collision location based on the position signal stored in the saving device and a position signal outputted by the vehicle operation detector;
the warning device being further configured to warn the vehicle driver when the processor determines that the vehicle approaches the past collision location.

17. The drive recorder for vehicle according to claim 14, wherein:
the predetermined term used for determining the decrementing the number of extractions is identical with respect to all the extracted position signals in the list.

18. The drive recorder for vehicle according to claim 14, further comprising:
an image pickup device configured to output image signals indicative of conditions around the vehicle, wherein:
the first memory is further configured to store during the first predetermined time period and overwriting during the subsequent iteration of the first predetermined time period, the image signals outputted by the image pickup device; and
the transferred signals, which are transferred by the processor with respect to the second predetermined time period from the first memory to the second memory, include the image signals in addition to the running state signals and the position signals.

* * * * *